US012763042B2

(12) United States Patent
Dasgupta

(10) Patent No.: US 12,763,042 B2
(45) Date of Patent: Oct. 13, 2026

(54) BENT STEEL SADDLE FOR S-STYLE GUITAR

(71) Applicant: Jayanta Dasgupta, Kolkata (IN)

(72) Inventor: Jayanta Dasgupta, Kolkata (IN)

( * ) Notice: Subject to any disclaimer, the term of this patent is extended or adjusted under 35 U.S.C. 154(b) by 292 days.

(21) Appl. No.: 18/737,759

(22) Filed: Jun. 7, 2024

(65) Prior Publication Data

US 2024/0412713 A1 Dec. 12, 2024

(30) Foreign Application Priority Data

Jun. 9, 2023 (IN) ............................ 202331039486

(51) Int. Cl.
*G10D 3/04* (2020.01)

(52) U.S. Cl.
CPC ..................................... *G10D 3/04* (2013.01)

(58) Field of Classification Search
CPC .. G10D 3/04; G10D 1/08; G10D 3/00; G10D 1/00
See application file for complete search history.

(56) References Cited

U.S. PATENT DOCUMENTS

| | | | | |
|---|---|---|---|---|
| 2,741,146 | A | 4/1956 | Fender | |
| 4,742,750 | A | 5/1988 | Storey | |
| 9,076,412 | B1 | 7/2015 | Rolling | |
| 2006/0042449 | A1 | 3/2006 | Chang | |
| 2022/0319472 | A1 | 10/2022 | Shishkov | |
| 2023/0120690 | A1 * | 4/2023 | Jackson .................. | G10D 3/10 84/298 |

* cited by examiner

*Primary Examiner* — Kimberly R Lockett
(74) *Attorney, Agent, or Firm* — The Webb Law Firm

(57) ABSTRACT

The present invention relates to a bent or stamped or pressed steel saddle of uniform thickness for s-style guitar. The saddle includes an elongated flat surface parallel to a horizontal surface and configuring an elliptical hole thereon, a first U-shaped hump region and a second U-shaped tail region on opposing sides of the elongated flat surface. The outer arm of the first U-shape is angled toward the inner arm of the first U-shape and the inner arm of the first U-shape is parallel to the curved surface of the second U-shape of the tail region. The entire inner walls of the first pair of arms of the first U-shape at the hump region and the inner surface of the height adjustment holes are configured with multiple threads to attain rigid grasp of the height adjustment screws therein.

9 Claims, 8 Drawing Sheets

BENT STEEL SADDLE FOR S-STYLE GUITAR

CROSS-REFERENCE TO RELATED APPLICATION

This application claims priority to Indian Patent Application No. 202331039486 filed Jun. 9, 2023, the disclosure of which is hereby incorporated by reference in its entirety.

BACKGROUND OF THE INVENTION

Field of the Invention

The present invention relates to a bent or pressed or stamped steel saddle of uniform thickness for s-style guitars.

In an s-style guitar the string is fed through a hole on the rear side of the body and emerges out from the front side first through a hole in the saddle plate and then through an elliptical hole on the bridge saddle. The string then traverses across the length of the body—over the pickups, and the length of the neck-up to the nut. It is finally wound around the tuning key on the head stock.

In case of a non-tremolo or hardtail guitar each of the strings enters the guitar through the ferules on the back of the guitar, travels through a hole, comes out of the top plate hole and then through the elliptical hole of the saddle. The string then traverses across the body, over the pickups and the length of the neck up to the nut. It is finally wound around the tuning key on the headstock.

In case of a guitar equipped with a tremolo unit, each of the six strings are fed through a hole on the back cover plate, which is on the back side of the guitar. Each string then enters a hole on the tremolo block, travels through its height and comes out of one of the six holes on the top plate. Then the string enters and comes out of the elliptical hole of the saddle and rests on the hump of the saddle. It traverses across the length of the guitar body—over the pickups and the length of the neck-up to the nut. It then passes through the nut and is finally wound around the tuning keys in the headstock.

Saddle:

A saddle is a small steel component which sits on the saddle plate on the front side of the guitar. It is one of the two fixed points between which the strings of a guitar oscillate, the other being the nut. It has a hump with threaded holes in which a pair of screws are affixed vertically for height adjustment. It has a flat section with an elliptical hole for string exit. It ends in a curled tail at the back of which is a threaded hole. A screw with a spring is attached herein horizontally for horizontal movement for intonation adjustment.

The saddle also helps transfer the resonance of the string to the wooden body of the guitar so that the whole instrument resonates to the desired frequency emitted by the oscillating string.

There are six saddles on a typical s-style guitar. The saddle is a small steel component that sits on the top plate on the front side of the guitar. It is one of the two fixed points between which the string oscillates, the other fixed point being the nut.

On one end of the saddle is a hump with two threaded holes, in each of which a screw is affixed vertically for height adjustment of the string. It has a flat section with an elliptical hole for string exit. The other side ends in a curled tail on the back of which is a single threaded hole. A screw with a spring is attached herein, horizontally, for horizontal movement of the saddle for intonation adjustment. Apart from being one of the two fixed points between which the string oscillates in a guitar, the saddle also transfers the vibrations of the strings to the wooden body of the s-style guitar, thus helping the whole instrument resonate with desired note/notes.

Although considerable effort has been made in the prior art towards the development and improvement of the s-style bent/pressed/stamped steel saddle over the years, there has remained an unmet need for such a saddle that will deliver improved resonance, less string breakage (at the saddle end), improved stability of the note, precision of tuning and intonation, ease of restringing and improved stability when using the tremolo arm.

The Tremolo Setup in an S-Style Guitar & its Use

In a tremolo equipped s-style guitar the wooden body is routed under the top plate to accommodate a solid metal block made of steel, zinc or brass. This metal block is called the tremolo block.

The tremolo block has six string holes in it for the strings to pass through. It is affixed under the top plate to the bottom of the top plate with screws. The tremolo block is also attached to a number of springs pulling it in the direction of the headstock. The top plate is screwed to the top of the guitar with a number of screws. This is the 'pivot point' and hence are called 'pivot screws' for clarity.

There is a steel tremolo arm which is passed through a hole in the top plate and threaded to the block. This arm acts as a 'lever'. The tremolo is set up in such a way that the whole tremolo bridge assembly can move/ride up and down when force is applied on the end of the tremolo arm.

When the tremolo arm is pressed down the whole tremolo assembly (the top plate with the attached saddles and the tremolo bar) lifts up slightly from the face of the instrument and reduces the tension of the strings, hence bringing down the pitch. When the tip of the tremolo arm is pulled up the tremolo assembly goes down, thus lifting the pitch of the strings by increasing string tension.

DESCRIPTION OF RELATED ART

U.S. Pat. No. 2,741,146 provides a tremolo device which is particularly adapted for use on guitars and similar stringed instruments played in such manner that one hand is in the region of the bridge, there being a tremolo control arm so arranged as to fit within the palm of the player's hand. The tremolo device which is incorporated in a novel bridge structure so arranged as to have limited pivotal movement, in order that the tension applied to the strings of the instrument may be readily varied to produce a tremolo effect.

US2022319472 discloses a saddle that may have an articulation mechanism positioned wholly outside of an aerial extent of the plurality of strings while contacting the saddle. The articulation mechanism can contact the tone plate to support the saddle during movement of at least one of the plurality of strings.

U.S. Pat. No. 4,742,750 discloses an apparatus for producing a vibrato effect in the strings of a musical instrument, comprising (a) a tremolo including horizontal and vertical portions, and (b) means pivotally connecting said tremolo with the instrument body portion, said connecting means comprising screw means threadably connected with the instrument body portion, said screw means including a head portion having a sharp circumferential edge, said tremolo recess receiving a portion of said sharp edge and pivoting there about, whereby when the instrument strings are connected with said tremolo and when said tremolo is pivoted about said sharp edge, the tension of the strings is varied to produce a vibrato effect.

U.S. Pat. No. 9,076,412 B1 describes a guitar string bender bridge mount couples to a guitar bridge through an existing bridge string mount. The bridge mount has a side wall and a slot in and extending to an edge of the side wall. A mounting screw couples into a standard hole on a guitar bridge and is rotatable to adjust the tuning of at least one of the guitar strings. A saddle lever is supported by the bridge mount and is pivotal through a limited arc, limited by low and high stops.

US20060042449 describes a guitar saddle structure that includes a bridge base and a plurality of string decks. The bridge base has a plurality of housing compartments each has a ramp on the left side and the S right side. Each of the string decks has a bucking surface on the left side and the right side corresponding to the ramp.

It is imperative to note here that the height screws of the saddles have to be firm in their positions at the time of tremolo use. If the screws are loose, they tend to change position when the tremolo bar is pressed down, and the string tension is loose. Hence perfect threads in the saddle hump and snugly fit/minimal tolerance height screws are required to keep the guitar in tune during tremolo use.

SUMMARY OF THE INVENTION

Therefore, it is an object of the present invention to propose an improved bent or pressed or stamped steel saddle for s-style guitar.

Another object of the present invention is to provide an improved saddle for s-style guitars that improves resonance delivering higher decibels and minimizes sound frequency distortion.

Another object of the present invention is to provide an improved saddle for s-style guitars which is easy to install and maintain.

Another object of the present invention is to provide easier intonation in s-style guitars.

Another object of the present invention is to improve tuning stability when using the tremolo arm in s-style guitars.

Another object of the present invention is to provide ease of installation and maintenance of saddles in s-style guitars.

Another object of the present invention is to minimize string breakage at the saddle end of s-style guitars.

The present invention relates to an improved bent or pressed or stamped steel saddle for s-style guitars. The proposed saddle has the following novel and inventive technical features:

The construction of the saddle has been so modified for having better resonance. The material of the select grade used improves the resonance. Further, the material of the screws and springs eliminates rusting from sweat due to nickel plating.

All lines of the profile are absolutely straight that minimizes sound distortion and frequency loss as sound travels in straight lines like light. Elliptical hole is moved forward towards the hump. Such a construction prevents contact between string and saddle thus preventing formation of kinks resulting in breakage at the point of contact of the string.

In the proposed saddle the screw holes are of superior registration and equidistant from the edge. It provides stability and precision of tuning and intonation. Perfect threading taps in the improved saddle is easy for installation. The thread in the tapped holes for height adjustment screw extends beyond material thickness along the inner walls of hump. Stability of the screw action results minimum play in engaged position.

In an aspect, hand buffing for mirror finish of hump surface where the string sits, minimizes the irregularity of surface and minimizes the tuning instability.

In an aspect, branding has been done with minimal depth on base surface, so that hardness properties of the area remain unchanged. Branding impression is kept at a minimum to reduce dead spots on the base.

In an aspect, straightness of the flat elongated surface ensures minimal distortion of sound waves as they travel along the length of the saddle.

In an aspect, elliptical hole has been moved towards the saddle hump. This ensures complete lack of contact of the string with the saddle hole to ensure longevity of string. Accuracy is maintained at all holes and taps to ensure tuning stability and intonation.

In an aspect, the threads in the hump for the saddle height adjustment screws are beyond the thickness of the material and are on both the inner walls of the hump. This enables the screws to be in full contact with the side walls. The latter, in turn, apply spring action pressure on the screws to keep them rigid and stationery. This helps the guitar to maintain perfect tuning.

The goal of these enhancements is to ensure that the saddles pick up the vibrations of the oscillating strings and resonate in tandem with all the pleasing frequencies of the strings without any gross distortions. This produces higher decibel levels throughout the frequency range while playing s-style guitars.

BRIEF DESCRIPTION OF THE DRAWINGS

The accompanying drawings are included to provide a further understanding of the present disclosure and are incorporated in and constitute a part of this specification. The drawings illustrate exemplary embodiments of the present disclosure and, together with the description, explain the principles of the present disclosure.

The terms Fig., Figs., Figure, and Figures are used interchangeably in the specification to refer to the corresponding figures in the drawings.

Persons skilled in the art will appreciate that elements in the figures are illustrated for simplicity and clarity and may have not been drawn to scale. Throughout the drawings, it should be noted that reference numbers are used to depict the same or similar elements, features, and structures.

DESCRIPTION OF THE INVENTION

In the following description, numerous specific details are set forth in order to provide a thorough understanding of embodiments of the present disclosure. It will be apparent to one skilled in the art that embodiments of the present disclosure may be practiced without some of these specific details.

Accordingly, those of ordinary skill in the art will recognize that various changes and modifications of the embodiments described herein can be made without departing from the scope of the invention.

The terms and words used in the following description and claims are not limited to the bibliographical meanings but are merely used to enable a clear and consistent understanding of the invention. Accordingly, it should be apparent to those skilled in the art that the following description of exemplary embodiments of the present invention are provided for illustration purpose only and not for the purpose of limiting the invention.

If the specification states a component or feature "may", "can", "could", or "might" be included or have a characteristic, that particular component or feature is not required to be included or have the characteristic. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The s-style guitar with prior art saddles can sound vastly different from one another. Some can sound tinny or small, lacking many crucial frequencies. Some sound smaller than others. Most seem to lack overall resonance even acoustically.

On closer study it was found that part of that problem was in the saddles themselves. The saddles were found to be manufactured inconsistently. In all instance the basis steel sheets used for the saddles were between 0.80 mm to 1.0 mm.

Figure 1:
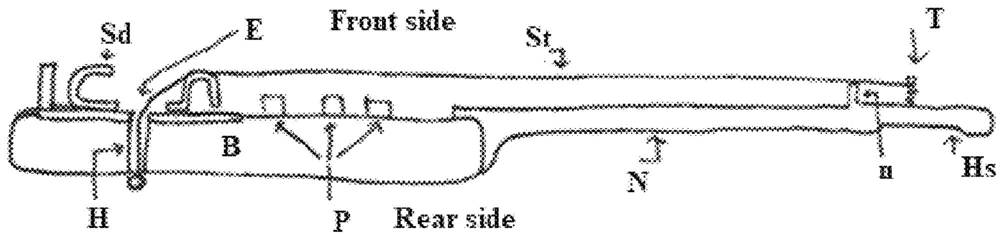
FIG. 1 illustrates the configuration of a standard s-style guitar.

In an s-style guitar, as illustrated in FIG. 1, the string St is fed through a hole H on the rear side of the body B and emerges out from the front side through an elliptical hole E on the bridge saddle Sd. The string traverses across the length of the body B— over the pickup sides P and the length of the neck N up to the nut n. It is finally wound around the tuning key T on the head stock Hs.

Figure 2:
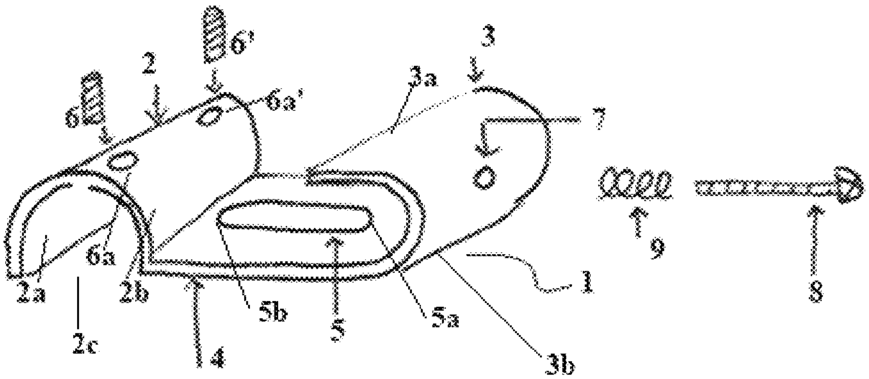
FIG. 2 illustrates the configuration of proposed saddle 1.

The present invention provides an improved bent or pressed or stamped steel saddle of uniform thickness for S-style guitar as illustrated in FIG. 2. The proposed saddle 1 is fabricated out of 1.2-1.5 mm thick CRCA steel. The mass of the saddle 1 is increased by 10%-15% as compared to the conventional saddle and that increased mass helps to generate the lower natural frequencies thus improving the low frequency (70-250 Hz) (bass) response.

In addition to that, the stiffness distribution of the additional mass is an important factor that affects the natural frequencies. Greater stiffness results in greater natural frequencies making the overall sound project better, which can be clearly heard acoustically and can be observed in graphical illustrations (discussed later).

The invented saddle 1 is fabricated from the blanks with no holes. The bent steel saddle 1 of uniform thickness for S style guitar, comprises an elongated flat surface 4 parallel to a horizontal surface and configuring an elliptical hole 5 thereon, wherein the length of the flat surface 4 being greater than its width.

A hump region 2 and a tail region 3 are on opposing sides of the elongated flat surface 4, wherein the hump region 2 is orthogonally bent in a first U-shape with respect to the elongated flat surface 4. The first U-shape comprises a first pair of outer and inner arms 2*a*, 2*b* and an open end 2*c* in downward direction when placed on a top plate of a bridge of an instrument.

The tail region 3 is bent in a second U-shape having a second pair of outer and inner arms 3*a*, 3*b* parallel to each other in horizontal direction with open end toward a headstock when placed on said bridge. The ends of the respective outer arms 2*a*, 3*a* of the hump region 2 and the tail region 3 define the height of the saddle 1.

The first U-shape at the hump region 2 configures a pair of height adjustment holes 6*a*, 6*a'* on its curved surface to threadably couple a pair of height adjustment screws 6, 6' therethrough. The pair of holes 6*a*, 6*a'* are punched on the hump side 2 after completing the bending operations for shaping the hump region 2. This ensures no undesirable elongation of the hole or surface distortion on the hump region 2. The tail region 3 is configured by bending the side of saddle 1 opposite to the hump region 2.

A hole 7 is located at the centre of the curved surface of the second U-shape at the tail region 3 to pass an intonation screw 8 with the aid of a spring 9 therethrough, The surface between the hump and the tail region is often bulged out in a conventional saddle which can hinder the transfer of vibrations, as sound travels in a straight line. A common problem while processing a flat sheet material known as 'Oil Canning' results a moderately visible deformation in the structure. The causes of 'Oil Canning' include several manufacturing factors, such as stresses on the material, misalignment, improper handling, and poor design.

In the preferred embodiment, due to proper designing of the elongated flat surface 4, in between the hump 2 and tail 3 regions, it is exactly parallel to a horizontal surface when the saddle 1 is kept on a horizontal plane. This feature eliminates the hindrance of the sound vibration from the saddle to the other side of the instrument. The elliptical hole 5 is closer to the hump region 2 than the tail region 3 and aligned with a top plate hole 10 and a tremolo block hole of the instrument.

Figure 3:
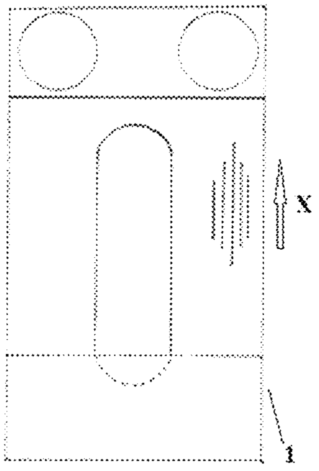
FIG. 3 illustrates the direction X of the grain in the sheet material.

In general, when a bending is done parallel to the grain of the sheet material, it creates a weaker bend than a bend line running against or transverse to the grain. The outside radius of the bend is more prone to cracking when bending is parallel to the grain direction. In the preferred embodiment, the saddle 1 is fabricated in such a way that the first pair of outer and inner arms 2*a*, 2*b* of the hump region 2 are perpendicular to the direction X of the grain of the sheet material used as illustrated in FIG. 3. When strings vibrate, they create a transverse wave with the string displacement which is being always perpendicular to the wave motion. The grains of the saddle 1 are parallel to the vibrating strings so the latter can pick up the vibrations and vibrate themselves in harmony with the least distortion, thus resulting in a pleasant resonance and sound.

Often times it has been noted that S-style guitars with the prior art saddles take longer time to intonate. On close inspection it is found that a large number of them had nonparallel bends. The hump on the saddle is not exactly parallel to the tail bend. It is also noted that the flat surface of the middle section is marginally bulged outwards to prove this problem. This structure results in distorting the overall shape of the saddle.

This comes in the way of quick and accurate intonation adjustments. Since the saddles no longer have parallel outer peripheries, they can graze against each other making the adjustment difficult.

In the preferred embodiment, the inner arm 2*b* of the first U-shape, proximal to the elongated flat surface 4, is parallel to the curved surface of the second U-shape of the tail region 3. At the same time, the elongated flat surface 4 is exactly parallel to the horizontal surface when the saddle is kept on a horizontal plane.

This in turn ensures accurate measurements and straight outer lines. Thus, the saddle 1 can be easily intonated individually without their grazing against the saddle next to them. This makes the intonation easier.

The tremolo equipped s-style guitar with the prior art saddles has been the most iconic guitar design for decades. However, the guitar gets de-tuned or out of the tune often when the tremolo arm is used. Most players suffer from it and try to find a workable solution.

This issue, so far, has not been solved despite the introduction of a novel nut design in the proposed saddle 1. In the available S-style saddles it has been noted that the two height adjustment screw holes 6, 6' on the hump region 2 where the height adjustment screws 6*a*, 6*a*' couple therewithin, have very few threads. The reasons are: (i) the top surface of the saddle is curved and (ii) the material is too thin to accommodate multiple threads.

When the height adjustment screws are affixed, it has been noted that the screws are loose and can move in any direction to a certain extent. Even in a product with a few threads inside the hump, the screws have been found to move since the two inner walls of the hump have no contact with the sides of the screws around halfway down its length.

Figure 4A:
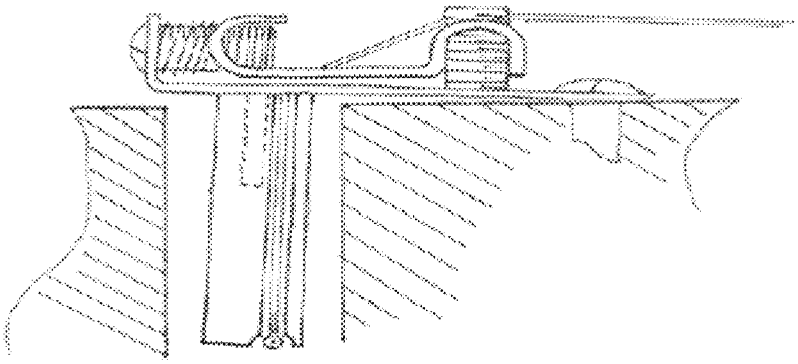
FIG. 4*a* illustrates the passage of the strings from the backside of the guitar for tremolo equipped s-style guitars along with the side cross section of the position of the strings of the tremolo.

FIG. 4*a* illustrates how the strings travel from the backside of the guitar for tremolo equipped S-style guitar along with the side cross section of the position of the strings of the tremolo.

Figure 4B:
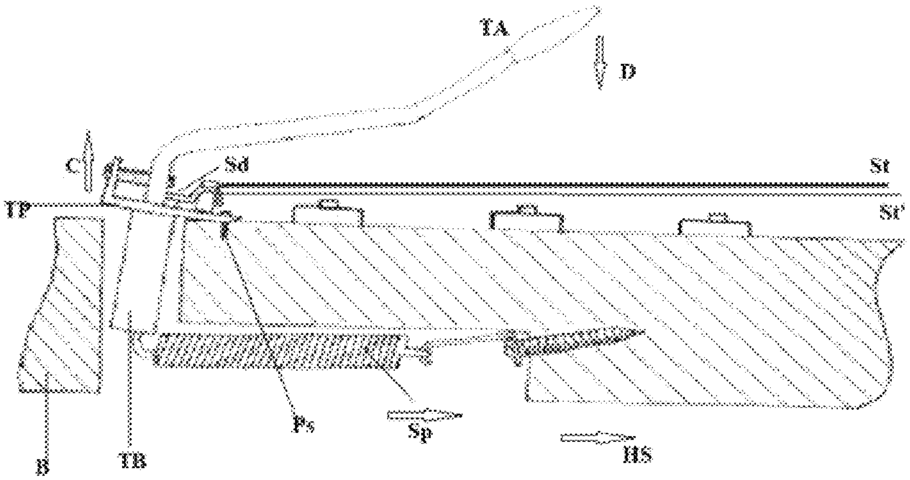
FIG. 4*b* illustrates the arrangement of loose height adjustment screws in a tremolo equipped s-style guitars with a tremolo arm, thereby effecting the tightness of the strings St.

The kind of loose height adjustment screws directly affect the tuning when the tremolo arm as illustrated in FIG. 4*b* is used. This is due to the following reasons—

As illustrated in FIG. 4*b*, when the tremolo arm TA is set up and the strings St are on the guitar the latter are taut and their tension on the saddles Sd make every part of the saddle stationery. However, it is noted that when pressure is applied on the tip of the tremolo arm TA along the direction D, the rear part of the tremolo assembly i.e. the top plate TP with the attached saddles Sd lifts up slightly along the direction C and the tension of the strings St reduce causing the strings to become loose to a position St'. The spring Sp attached with the tremolo block TB moves along the direction of the headstock Hs. In this position, if the height screws are loose, they tend to change position or move due to the overall movement caused by the action. When the tremolo arm TA is released the string tension goes up again, but the changed position of the height screws causes minor changes in the height of the hump side of the saddle Sd therefore bringing minor changes in the overall string tension of those particular saddles. Thus, causing the guitar to de-tuned or go out of tune.

Figure 5:
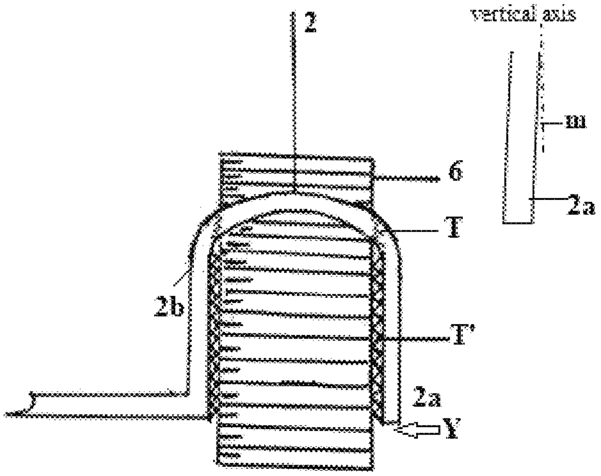
FIG. 5 illustrates hump region 2 with threads in the inner walls of the arms 2*a*, 2*b* and in the inner surface of the height adjustment screw holes 6*a*, 6*a'*.

The proposed saddle 1 is made out of 1.2-1.5 mm thick CRCA bent steel sheets. This enables a greater number of threads, 2-4 turns of threads T on the inner surface of the two holes 6*a*, 6*a*' of the hump 2, making the height adjustment screws 6, 6' more rigidly placed within the holes 6*a*, 6*a*' as compared to a standard saddle. The proposed saddle 1 as illustrated in FIG. 5, also employs threads T' along the entire inner surfaces of the inner and outer arms 2*a*, 2*b* of the hump region 2.

In the preferred embodiment, the proposed saddle 1 is fabricated in a manner such that the outer arm 2*a* of the first U-shape at the hump region 2, which is distal to the elongated flat surface 4, is angled (m=2-4 degree with respect to the vertical axis) toward the inner arm 2*b* of the first U-shape. The outer arm 2*a* of the hump region 2 is angled inwards as mentioned which is shown by an arrow Y in FIG. 5.

Due to the above-mentioned configuration, the height adjustment screws 6, 6' when engaged in place of the height adjustment holes 6*a*, 6*a*' affix better at the top curved surface of the holes 6*a*, 6*a*' with a greater number of threads. The screw shaft is kept in full contact on either side of the inner walls of the hump 2, engaged with the inner threads T.

To top it off, the slightly inward angled outer wall 2*a* of the hump region 2 presses down on the screws 6, 6' to keep them stationery in their places thus negating any movement of the screws 6, 6' of any kind whatsoever. The entire inner walls of the first pair of arms 2a, 2b of the first U-shape at the hump region 2 and the inner surface of the height adjustment screw holes 6a, 6a' configured with multiple threads facilitates in attaining a rigid grasp of the height adjustment screws 6, 6' therein.

Figure 6A:
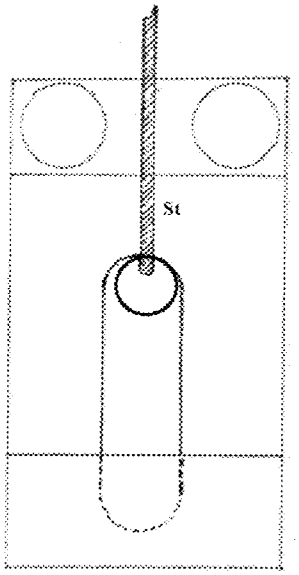
FIG. 6*a* illustrates the position of the elliptical hole on the flat surface of a standard saddle.

As illustrated in FIG. 6a, the prior art has the elliptical hole position in such a place that the strings when exiting from the top plate holes touch the sides of the elliptical holes of the saddles thereby causing additional snag and pull on the string, hence disturbing fluid movement of the string during tremolo use. This adds to de-tuning the guitar during tremolo use.

Figure 6B:
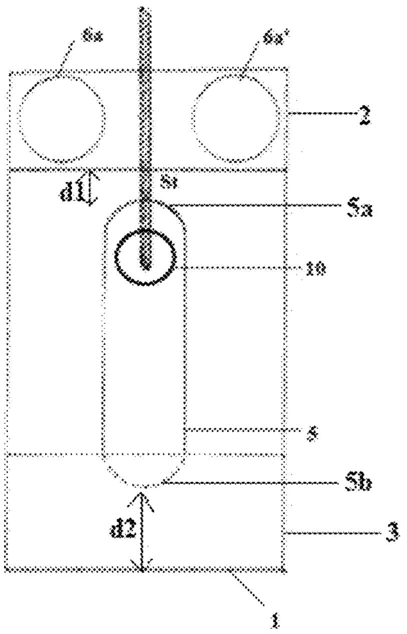
FIG. 6*b* illustrates the position of the elliptical hole 5 on the flat surface of the proposed saddle 1.

In the proposed saddle 1, as illustrated in FIG. 6b an edge 5a of the elliptical hole 5 on the hump 2 side is closer to the hump region 2 than the other edge 5b of the elliptical hole 5 on the tail 3 side to the tail region 3; [d1<d2, d2 is approximately 6-8 times d1, d1=distance between the edge 5a and the edge of the hump 2, d2=distance between the edge 5b from the edge of the tail 3; wherein edge of the hump corresponds to the edge junction between the arm 2b and the surface 4 and the edge of the tail corresponds to the edge junction between the arm 3b and the surface 4], so that there can be no physical contact between the circumferential sides of the elliptical hole 5 and the string St, as it exits the top plate hole 10. The string St in this case exits the top plate hole 10 and directly makes contact with the top of the hump 2. Hence there is no snag or pull from contact with the flat part of the saddle 1. This improves tuning stability during tremolo use.

Figure 7:
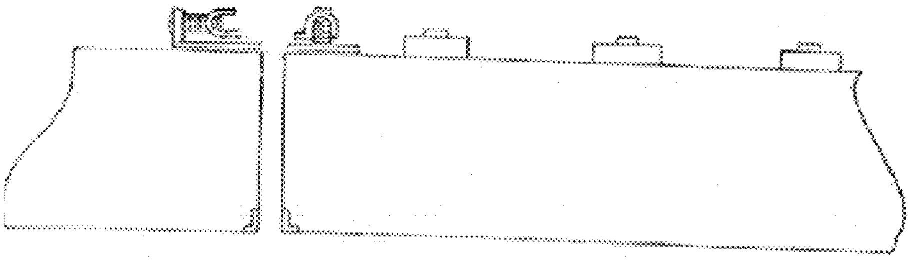
FIG. 7 illustrates the position of the elliptical hole 5 on the flat surface 4 of the saddle 1 in an aligned position with the top plate hole 10 and the tremolo block hole.

The proposed saddle 1 has been designed in such a way that the elliptical hole 5 positioned on the flat surface 4 of the saddle 1 in an aligned position with the top plate hole 10 and the tremolo block hole to enable easy and quick string St change of the guitar. It is ensured that at no position of the intonation process (forward or backward movement of the saddles) the elliptical hole 5 of the saddle 1 will block the top plate hole 10. This enables easy installation in tremolo equipped and non-tremolo equipped s-style guitars as illustrated in FIG. 7. Since there is no contact of the string St with the sides of the elliptical hole 5 at any point there is minimal string breakage at the saddle end, hence enabling lower maintenance.

In case of the prior arts, often times it is extremely difficult to string up the guitar. This is because one must align the tremolo block hole with that of the top plate and the elliptical hole of the saddle to pass the strings from the back of the guitar, through the thickness of the guitar and bring it out to the front side, out of the elliptical hole of the saddle to string up the guitar in case of tremolo equipped s-style guitars.

It has been noted that all guitars equipped with the prior art saddles have frequent string breakage at the saddle end. This is because when the strings come out of the top plate, due to non-alignment it touches the edge of the elliptical hole on the saddle. The edge walls of the elliptical hole are sharp due to the nature of the hole punching operation of the manufacturing process. The guitar string touches this sharp edge and rests on it in the strung condition. When the tremolo arm is rocked it naturally grazes this point repeatedly, eventually developing a kink on the surface of the string. Over the time, this kink is the breakage point of the string.

The proposed invention employs a saddle 1 in which the elliptical hole 5 is positioned in such a place that the string cannot touch its edges at any point, even with extreme intonations. The string in this case comes out of the top plate holes 10 (FIG. 6b) and travels directly to the hump 2 of the saddle 1 without any contact with the edges of the elliptical hole 5. This design eliminates the formation of kinks and weak spots on the strings at the saddle end from where it can break.

Figure 8A:
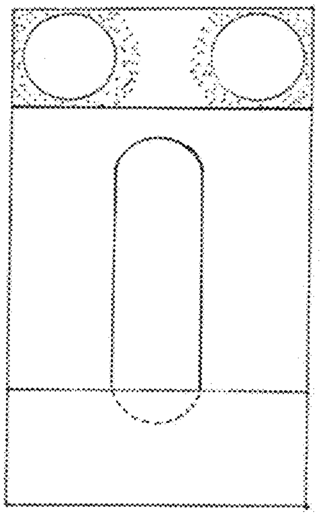
FIG. 8*a* illustrates a damage on the surface around the height adjustment screw holes in a standard saddle.

In some cases, it has been noted that the surface area around the height adjustment screw holes on the hump have irregularities in a circular pattern around them. This is caused by a manufacturing process flaw when the punching of the hole is done with excessive force from the top of the hump's radius, thus flattening the latter in a circular pattern around the hole. This too can cause inconsistent vibration of the strings, and weak notes and undesirable harmonics when the string rests on this area of the hump. The existing saddles suffer from a damage on the surface around the height adjustment screw holes as illustrated in FIG. 8a by the dotted portions.

The proposed saddle 1 configures a perfectly formed and polished surface of the hump region 2 as illustrated in FIG. 6b that enables the string to move back to its prior position each time the tremolo arm is released. The holes 6a, 6a' in the hump 2 are made in a specific way so as not to disturb or damage the top surface of the hump 2. Moreover, they are hand polished at the end of bending and also nickel plated to attain a flawless, unblemished specular finish on the outer surface of the hump 2. As a result, the strings will not find any irregularities on the hump 2 surface and the string vibration will always be consistent, clear and unhindered.

Figure 8B:
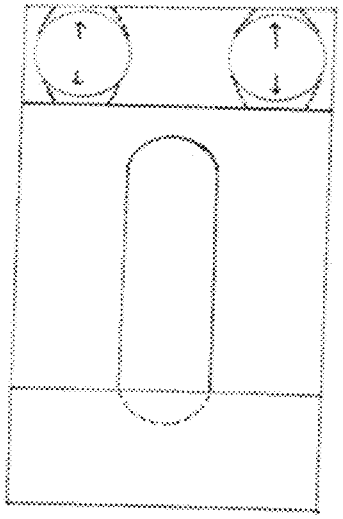
FIG. 8*b* illustrates the faulty elliptical geometry of the height adjustment screw holes in a standard saddle.
Figure 9A:
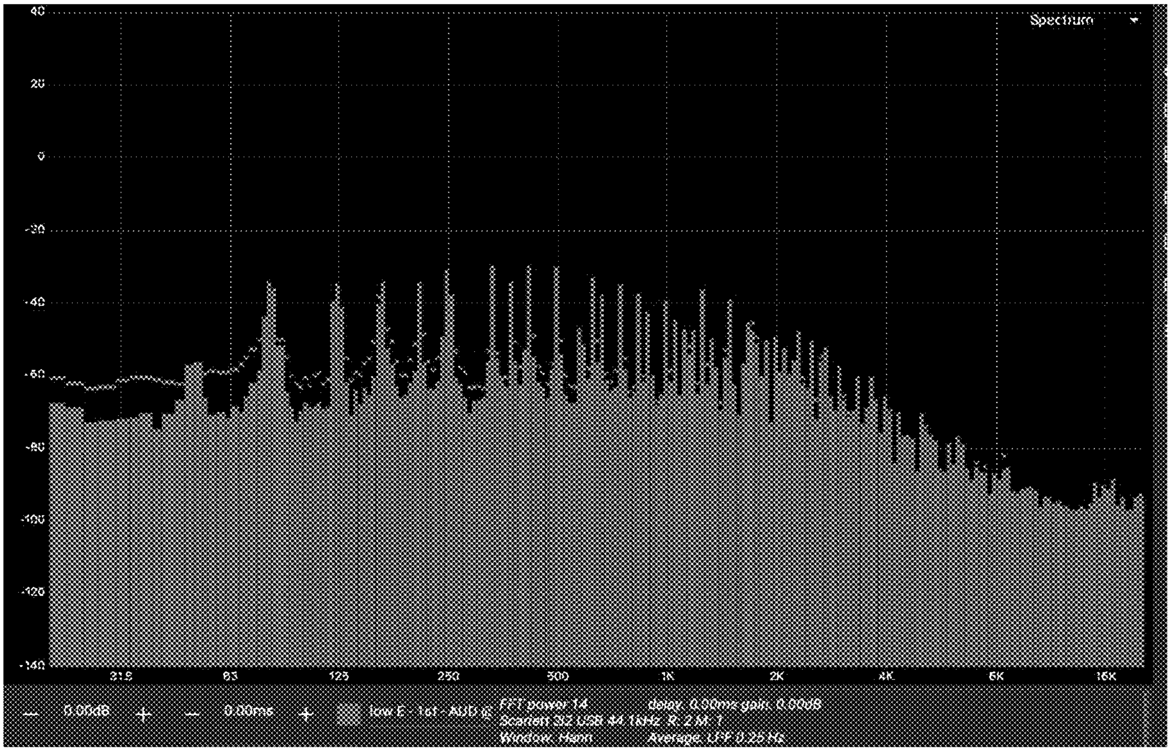
FIG. 9*a* illustrates the spectrum of the sound frequency collected from an instrument using the proposed saddle 1 with the low 'E' string on the 1st position of the pick-up selector switch of the s-style guitar.
Figure 9B:
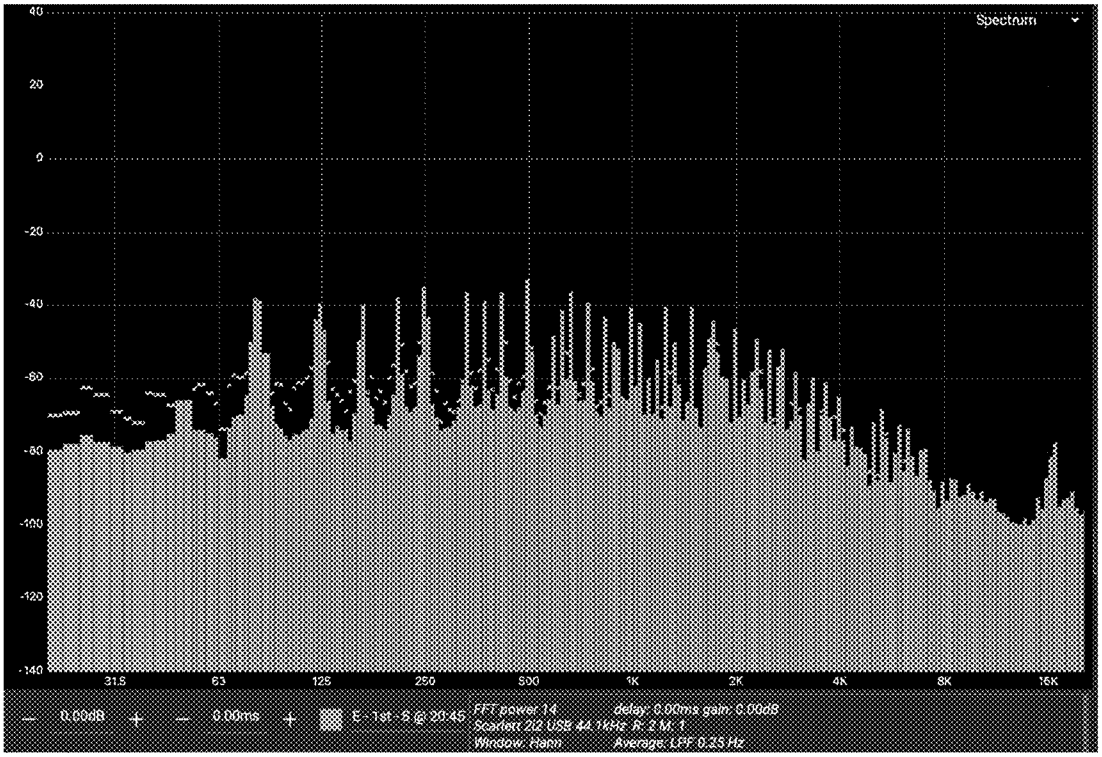
FIG. 9*b* illustrates the spectrum of the sound frequency collected from an instrument using a standard saddle (S) with the low 'E' string on the 1st position of the pick-up selector switch of the s-style guitar.
Figure 10A:
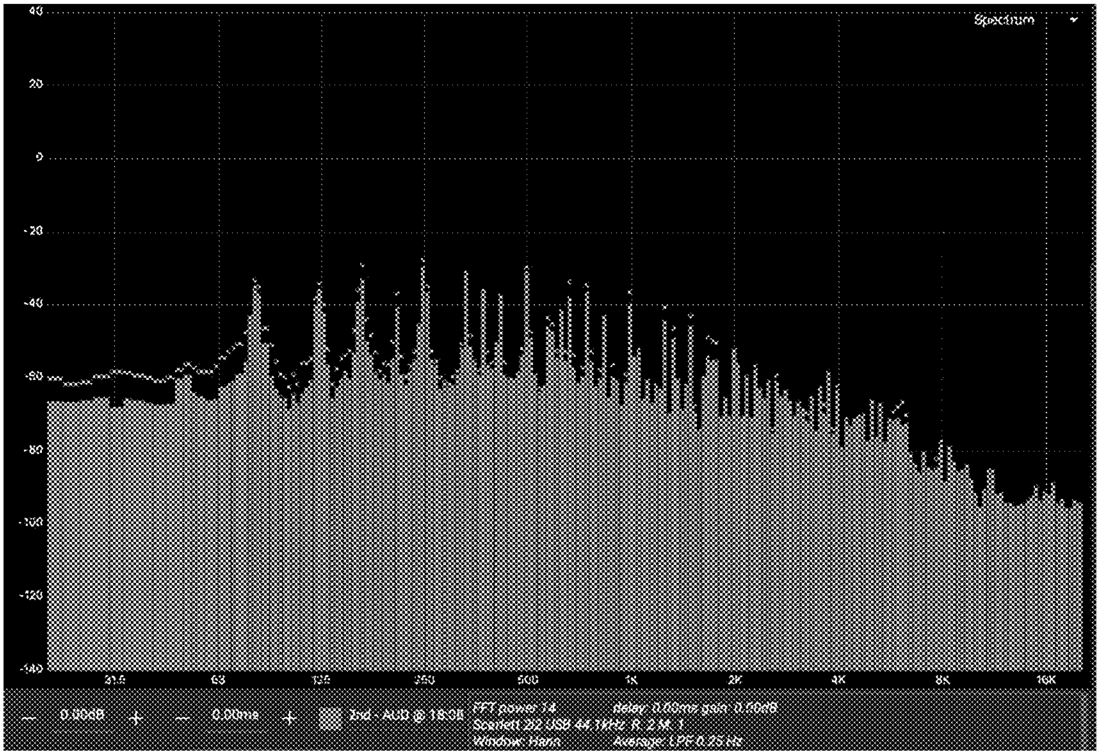
FIG. 10*a* illustrates the spectrum of the sound frequency collected from an instrument using the proposed saddle 1 with the low 'E' string on the 2nd position of the pick-up selector switch of the s-style guitar.
Figure 10B:
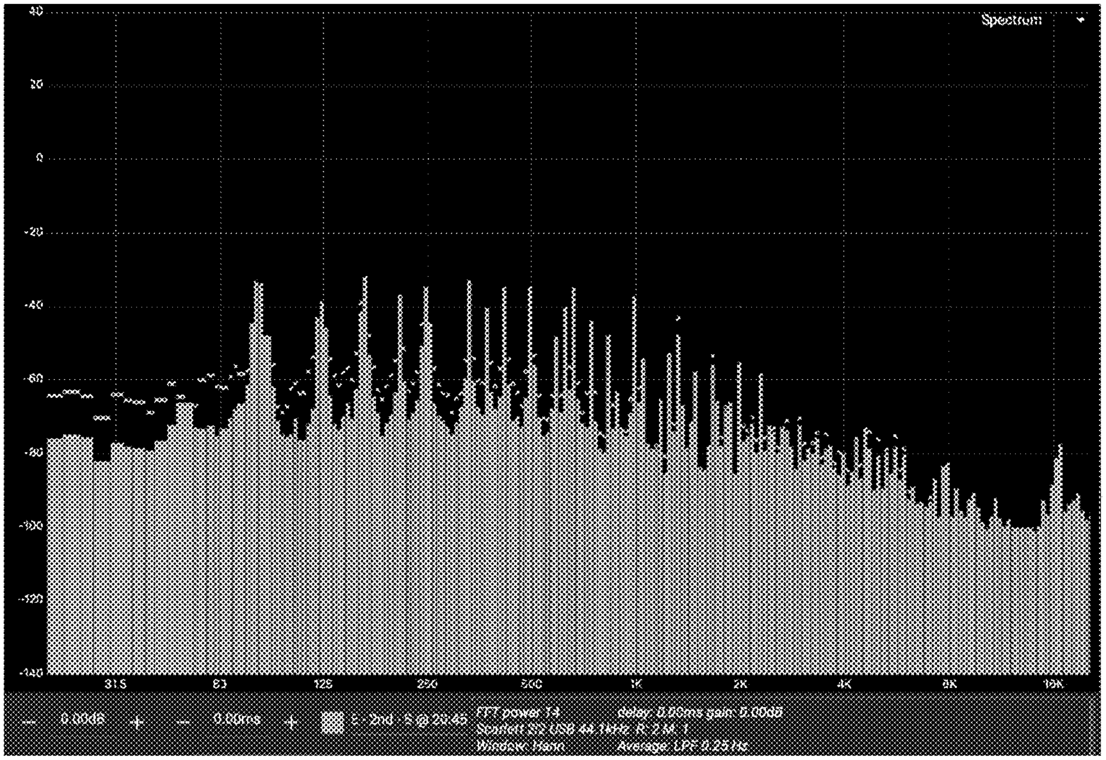
FIG. 10*b* illustrates the spectrum of the sound frequency collected from an instrument using a standard saddle with the low 'E' string on the 2nd position of the pick-up selector switch of the s-style guitar.
Figure 11A:
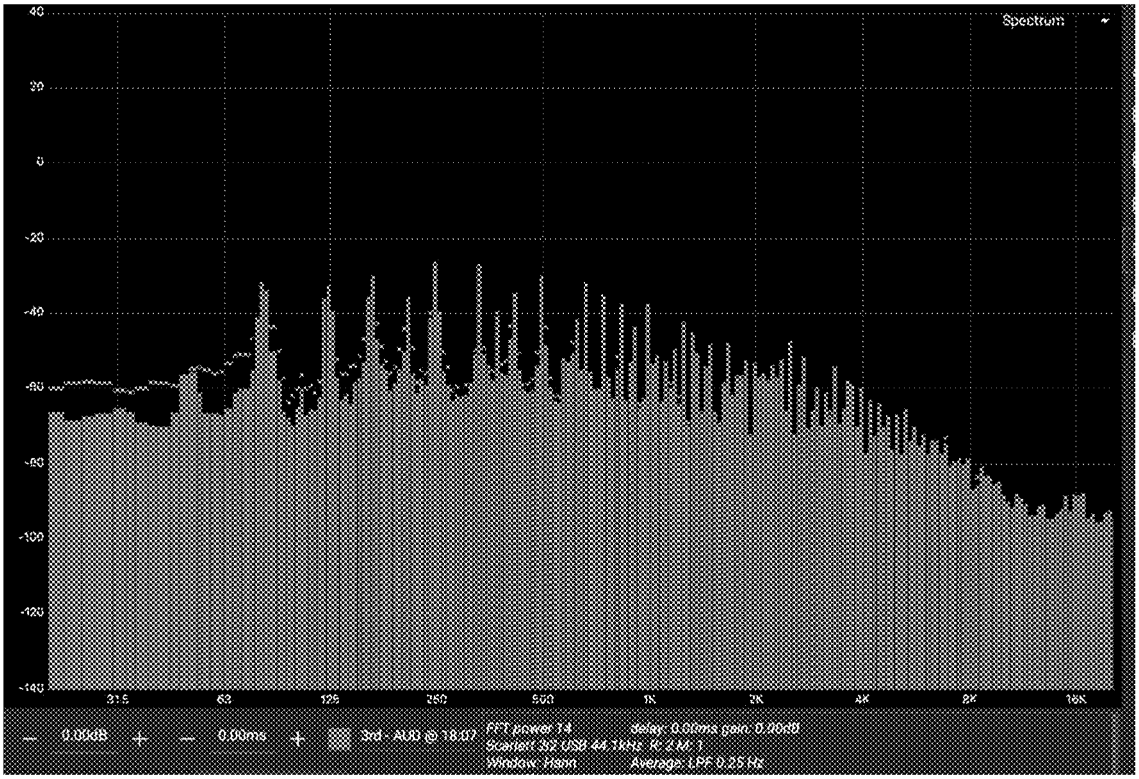
FIG. 11*a* illustrates the spectrum of the sound frequency collected from an instrument using the proposed saddle 1 with the low 'E' string on the 3rd position of the pick-up selector switch of the s-style guitar.
Figure 11B:
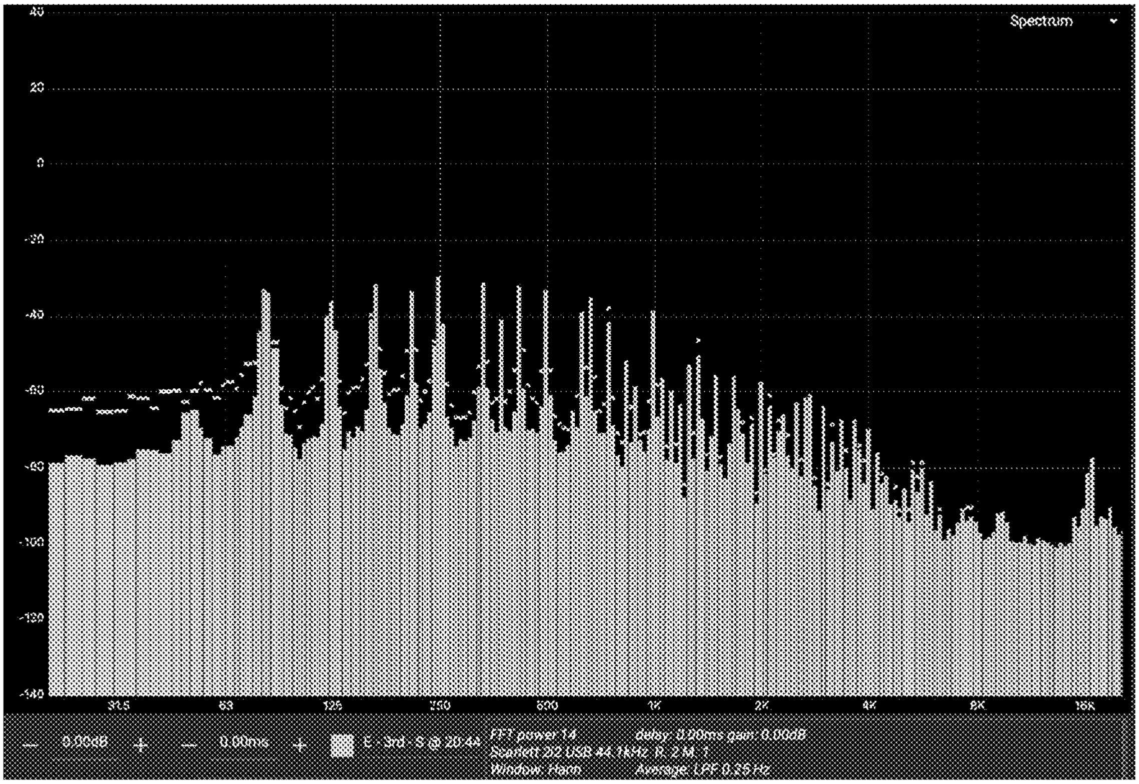
FIG. 11*b* illustrates the spectrum of the sound frequency collected from an instrument using a standard saddle with the low 'E' string on the 3rd position of the pick-up selector switch of the s-style guitar.
Figure 12A:
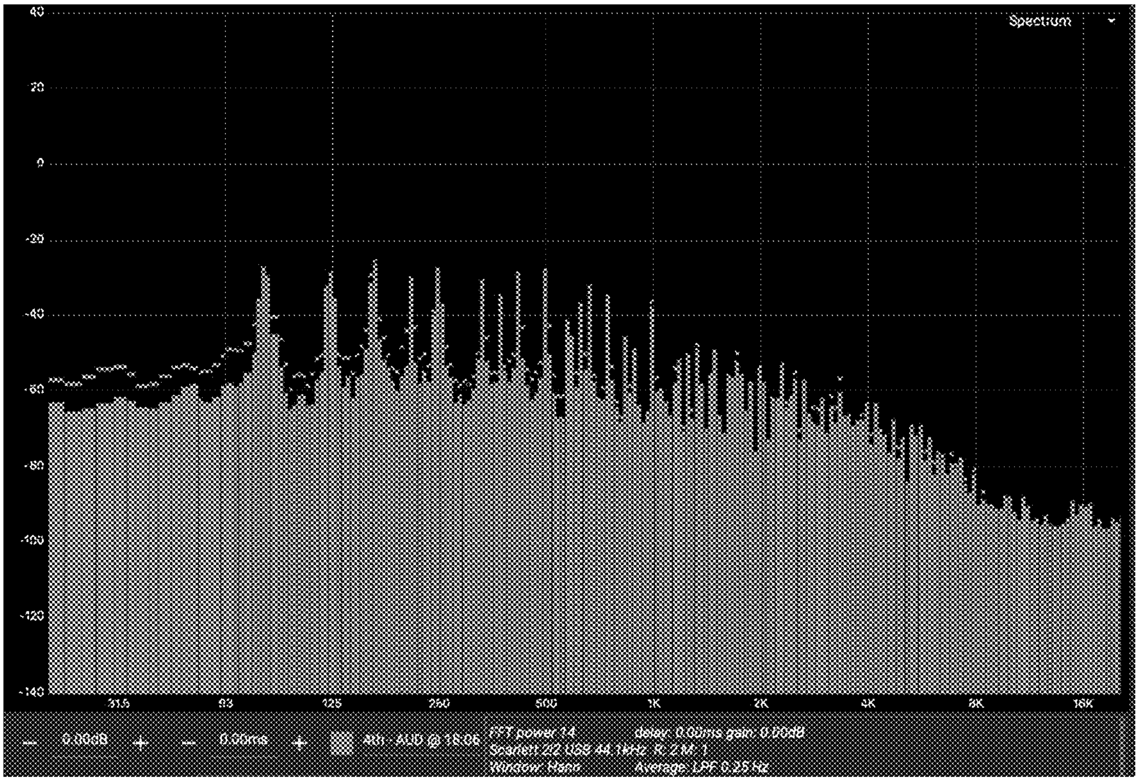
FIG. 12*a* illustrates the spectrum of the sound frequency collected from an instrument using the proposed saddle 1 the low 'E' string on the 4th position of the pick-up selector switch of the s-style guitar.
Figure 12B:
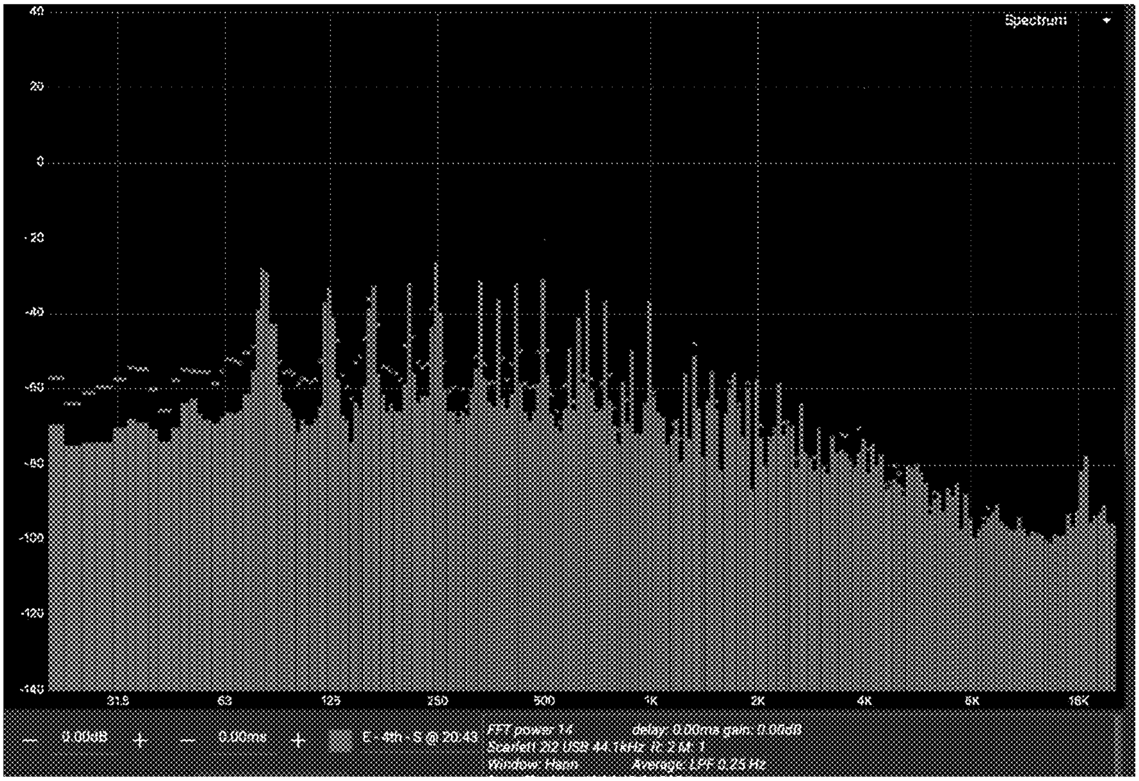
FIG. 12*b* illustrates the spectrum of the sound frequency collected from an instrument using a standard saddle with the low 'E' string on the 4th position of the pick-up selector switch of the s-style guitar.
Figure 13A:
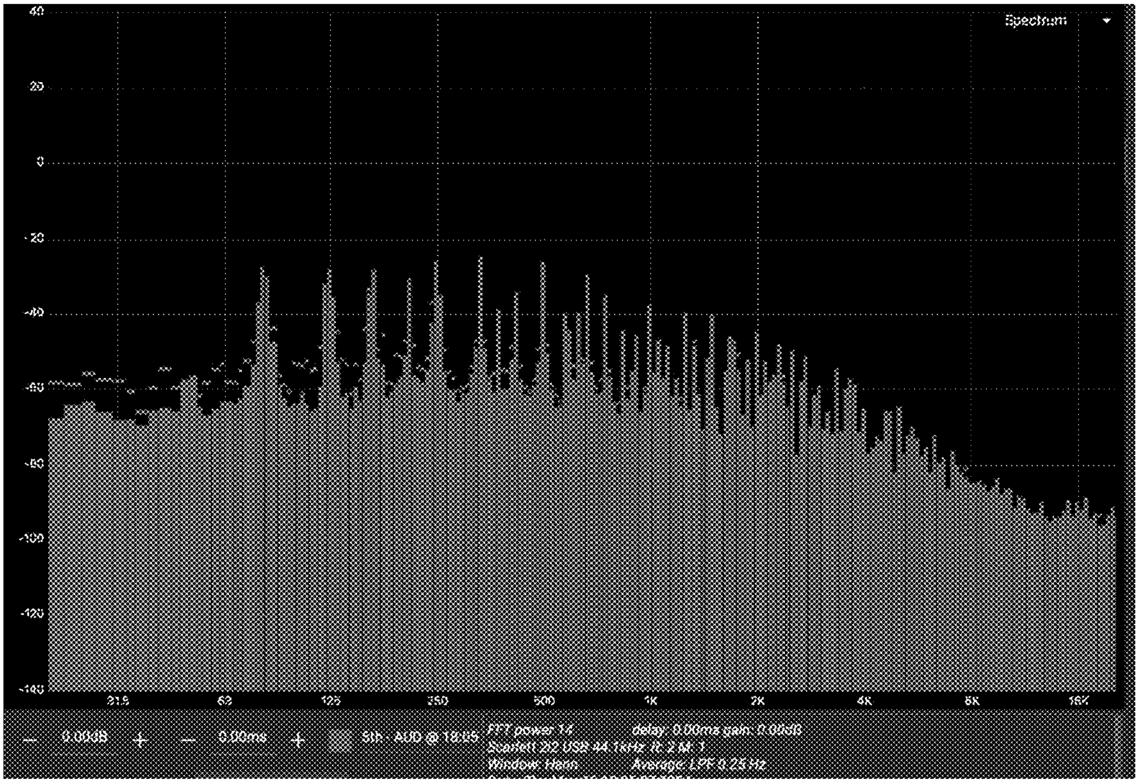
FIG. 13*a* illustrates the spectrum of the sound frequency collected from an instrument using the proposed saddle 1 with the low 'E' string on the 5th position of the pick-up selector switch of the s-style guitar.
Figure 13B:
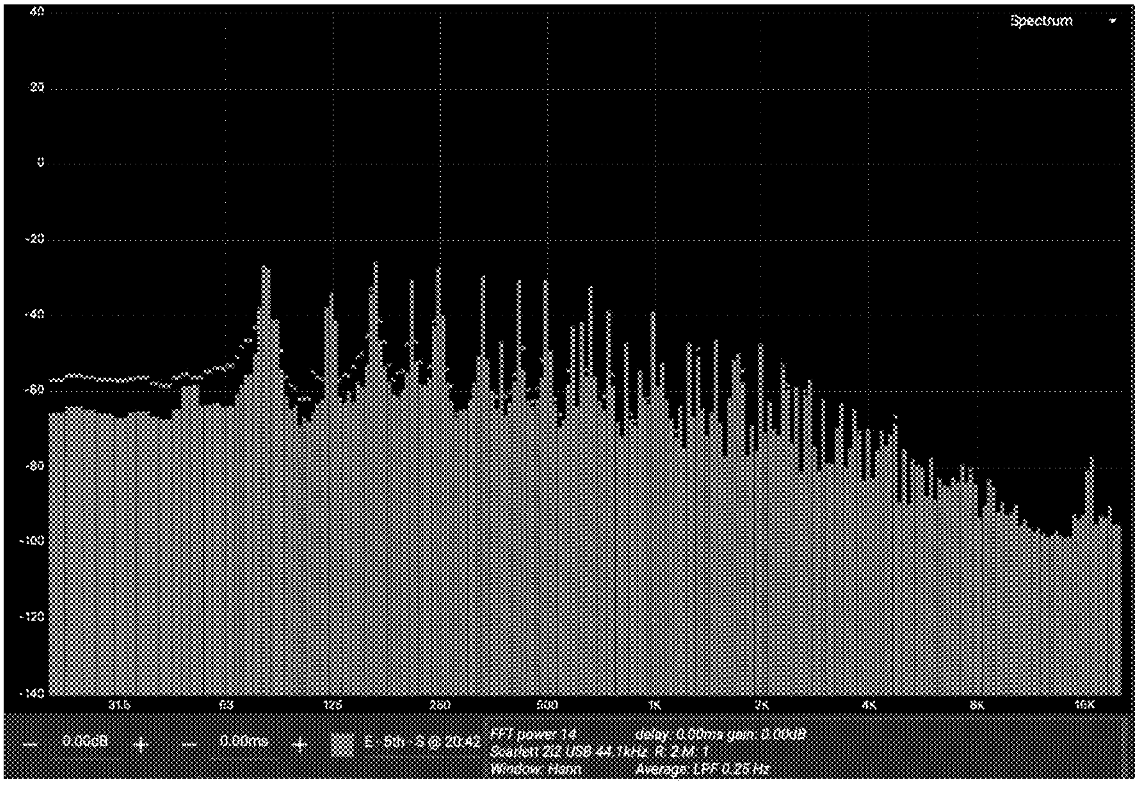
FIG. 13*b* illustrates the spectrum of the sound frequency collected from an instrument using a standard saddle with the low 'E' string on the 5th position of the pick-up selector switch of the s-style guitar.

In some cases, the holes on the hump were slightly elongated in the longitudinal direction of the saddle with surface irregularities around the hole. This is caused by a manufacturing process flaw. It is apparent that the holes were made before the bending operation. The bending operation had extended the holes and material had flowed in an elliptical appearance around them, thus making the screws loose as well as the surface of the hump irregular. This irregular surface comes in the way of the strings vibrating freely when seated on it. Due to a faulty operation during the bending of the hump for a conventional saddle, the circular geometry of the height adjustment screw holes is often not maintained and becomes elliptical as shown by the dotted lines in FIG. 8b.

In addition to that, the flow of the material on either side of the arms of the hump reduces the height of the hump and detunes the string. The proposed saddle 1 overcomes such problem as it configures exact circular circumference of the height adjustment screw holes 6a, 6a' due to its specific bending operation.

An audio data has been taken on an Open Sound Meter, Version 1.3 software at 0 dB at unity. The input has been recorded as a data through a Focusrite Scarlett 2i2 audio interface as illustrated in FIGS. 9-13 (a-b) and recorded on a MacBook. FIGS. 9a, 10a, 11a, 12a, 13a illustrate the spectrum of the sound frequency collected from an instrument using the proposed saddle 1 with the low E string on the $1^{st}$ through the $5^{th}$ positions of the pick-up selector switch of the s-style guitar respectively. FIGS. 9b, 10b, 11b, 12b, 13b illustrate the spectrum of the sound frequency collected from an instrument using a standard saddle (S) with the low E string on the $1^{st}$ through the $5^{th}$ positions of the pick-up selector switch of the s-style guitar respectively. The graphical representation clearly illustrates a significant improvement on the frequency range (550 Hz-4 KHz) and the decibels (higher decibels) when the proposed saddle is used as compared to a standard saddle.

The present disclosure is not limited to the described embodiments, versions or examples, which are included to enable a person having ordinary skill in the art to make and use the present disclosure when combined with information and knowledge available to the person having ordinary skill in the art and thus it is intended by the appended claims to cover all such modifications and adaptations which fall within the scope of the present subject matter.

What is claimed is:

1. A bent steel saddle of uniform thickness for s-style guitar, comprising:

an elongated flat surface parallel to a horizontal surface and configuring an elliptical hole thereon to pass a string of the guitar therethrough, wherein the length of the flat surface being greater than its width, a hump region and a tail region on opposing sides of the elongated flat surface, wherein the hump region being orthogonally bent in a first U-shape with respect to the elongated flat surface, wherein said first U-shape being configured with a first pair of outer and inner arms and an open end in downward direction when placed on a top plate of a bridge of an instrument, wherein the tail region being bent in a second U-shape having a second pair of outer and inner arms parallel to each other in horizontal direction with open end toward a head-stock when placed on said bridge, wherein the ends of the respective outer arms of the hump region and the tail region define the height of the saddle, a pair of circular height adjustment screw holes on the curved surface of the first U-shape at the hump region equidistant from the edges of said region to threadably couple a pair of height adjustment screws therethrough, a circular hole located at the centre of the curved surface of the second U-shape at the tail region to pass an intonation screw with the aid of a spring therethrough, wherein the outer arm of the first U-shape of the hump region, distal to the elongated flat surface, being angled toward the inner arm of the first U-shape at an angle 'm' with the vertical axis, wherein the inner arm of the first U-shape of the hump region, proximal to the elongated flat surface, being parallel to the curved surface of the second U-shape of the tail region, wherein the elliptical hole being configured closer to the hump region than the tail region and aligned with a top plate hole and a tremolo block hole of the instrument, wherein the entire inner walls of the first pair of arms of the first U-shape at the hump region and the inner surface of the height adjustment screw holes being configured with multiple threads to attain rigid grasp of the height adjustment screws therein.

2. The saddle as claimed in claim 1, wherein the thickness of the first pair of arms of the first U-shape at the hump region facilitates adequate multiple threads on the inner walls of said arms.

3. The saddle as claimed in claim 1, wherein the thickness of the curved surface of the first U-shape at the hump region facilitates adequate multiple threads on the inner surface of the height adjustment screw holes.

4. The saddle as claimed in claim 1, wherein the first pair of arms of the first U-shape being formed perpendicular to the direction of the grain of a sheet material.

5. The saddle as claimed in claim 1, wherein the height adjustment screws being engaged in the multiple threads at the inner walls of the first pair of arms of the first U-shape at the hump region make full contact with said inner walls, thereby with the hump.

6. The saddle as claimed in claim 1, wherein the height adjustment screw holes configure exact circular circumference to provide required tolerance.

7. The saddle as claimed in claim 1, wherein the space around the height adjustment screw holes being hand-polished to attain a specular finish.

8. The saddle as claimed in claim 1, wherein the material of the screws and the springs eliminates rusting from sweat.

9. The saddle as claimed in claim 1, wherein the distance between the hump region and the edge of the elliptical hole proximal to the hump region is less than the distance between the tail region and the edge of the elliptical hole proximal to the tail region.

* * * * *